Patented Feb. 27, 1951

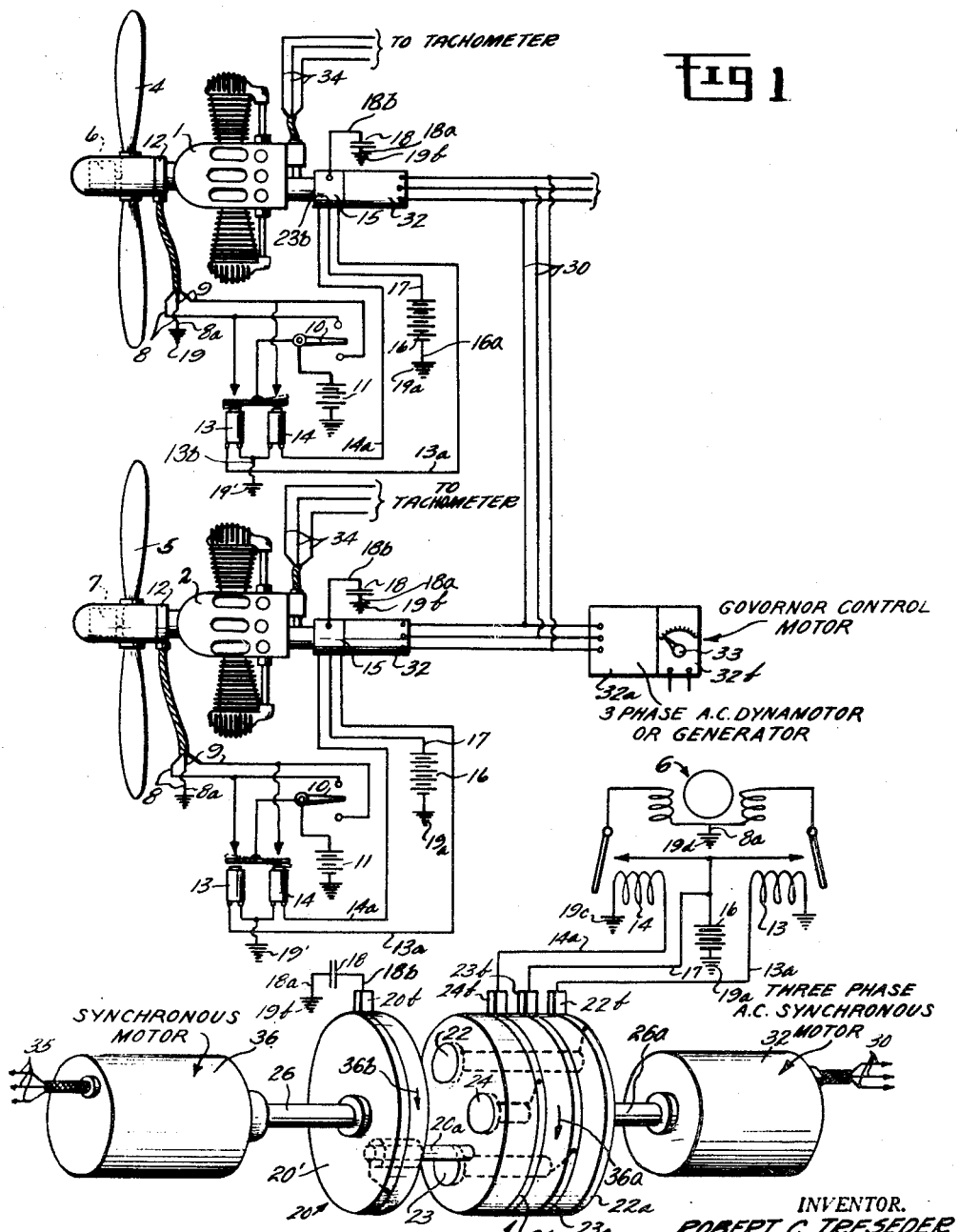

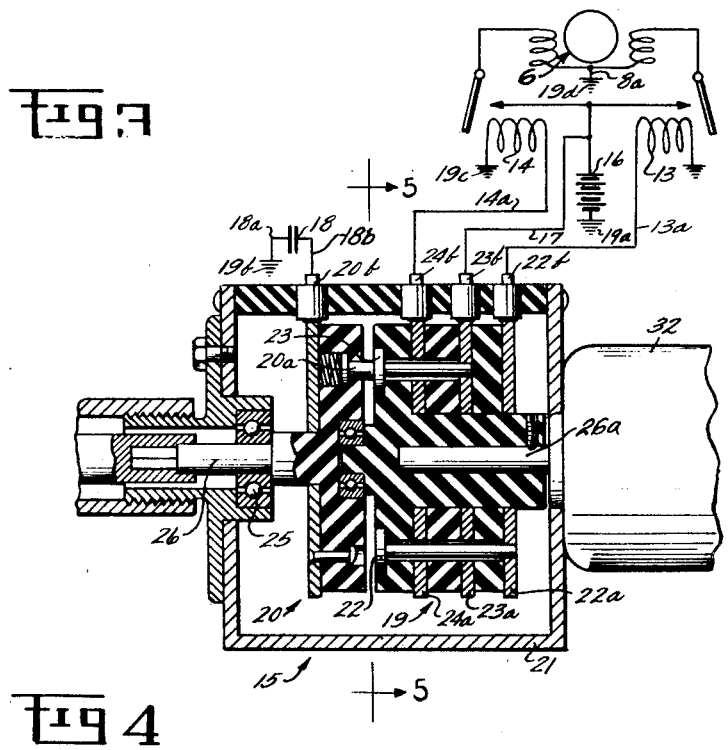
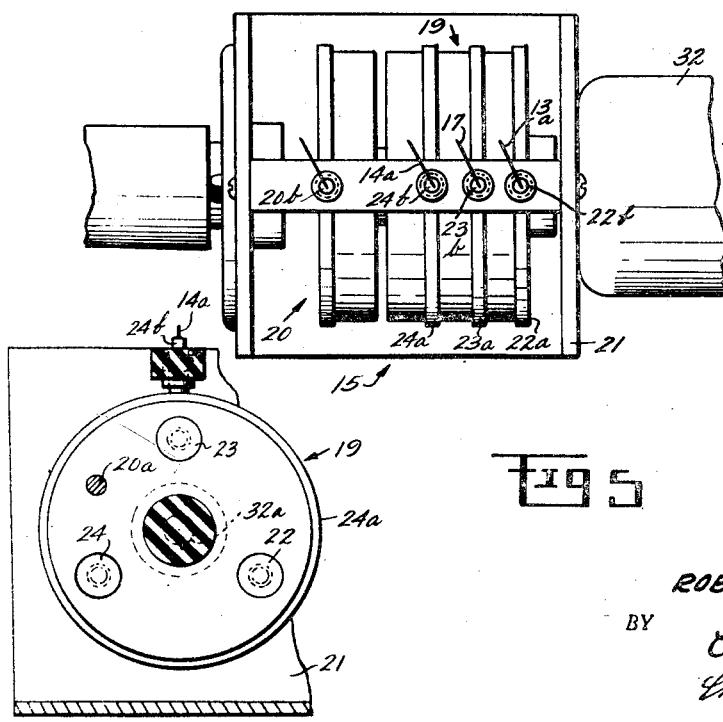

2,543,077

UNITED STATES PATENT OFFICE 2,543,077

ENGINE SYNCHRONIZER DEVICE

Robert C. Treseder, Dayton, Ohio

Application July 3, 1946, Serial No. 681,279

9 Claims. (Cl. 60—97)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in synchronizing means for synchronizing the movement or speed of two or more prime movers such as aircraft engines and has for an object the provision of novel electro-mechanical speed synchronizing control apparatus for controlling the speed regulating means of one or more of the prime movers to synchronize the speeds thereof to the speed of another rotating member or prime mover having predetermined reference speeds.

Another object is the provision of novel electromechanical apparatus for maintaining the speed of rotation of a plurality of propellers of a multipropeller aircraft in synchronized speed relation.

A further object is the provision of a simple, inexpensive, electro-mechanical speed synchronizing control device for aircraft engines having electrically operative reversible servomotor controlled speed governing means including a speed increasing control circuit connection and a speed decreasing control circuit connection, in which the synchronizer control device includes synchronizing means connected to an electric source, and including an energizing circuit having electrical energy storing means therein operable under the control of said synchronizing means to be electrically charged from said electrical energy source and selectively substantially fully discharged into one or the other of speed increasing and decreasing control circuit connections for the speed governing means due to a variation in the speed of the propellers, to adjust the speed control means to bring the propellers again into synchronized speed relation.

A further object is the provision of electromechanical speed synchronizing means for a multi-propeller aircraft for maintaining the propellers in synchronized speed relation by changing the pitch of the propellers in which electrically controlled pitch change means is provided for each propeller selectively operable by separate pitch increasing and decreasing electrical control circuit connections, and in which said synchronizing means includes a rotary circuit controlling contact member operable at a reference speed and cooperating independently operable rotary contact means operable in synchronized speed relation with each of the propellers to be synchronized, in which one of the rotary contact members includes electrical energy storing and charging circuit of finite value adapted to be connected to a current source to be charged and then disconnected from said current source and selectively connected to one or the other of said pitch increasing or decreasing control circuit connections to energize the circuit to relatively decrease or increase the propeller pitch to control the rotative speed of the contact member and to be substantially discharged while connected to said selective control circuit.

Other objects and advantages will be apparent from the following description taken in connection with the accompanying drawing in which like reference characters refer to like parts in the several figures:

Fig. 1 is a schematic assembly view illustrating an exemplary embodiment of my improved synchronizing apparatus for synchronizing the speed of two aircraft engines with a master speed regulating device having a predetermined reference speed;

Fig. 2 is a diagrammatic view illustrating my improved synchronizer device in perspective and a schematic wiring circuit, including means for synchronizing one engine with respect to the speed of a second engine having a desired reference speed;

Fig. 3 is a vertical longitudinal sectional view through the improved synchronizer device, and illustrating the same associated with a conventional governor controlled prime mover or motor for establishing the controlling speed of the plural contact member, part of the prime mover being broken away.

Fig. 4 is a top plan view of the synchronizer unit illustrated in Fig. 3, with the speed governing motor unit broken away; and Fig. 5 is a vertical sectional view taken on the line 5—5 of Fig. 3 and looking in the direction of the arrows.

Referring more particularly to Fig. 1, the reference numerals 1 and 2 indicate two aircraft engines or prime movers to be synchronized, each of the engines driving conventional propellers 4 and 5 having pitch change mechanisms 6 and 7 operable to increase or decrease the pitch of the propeller blades and thereby effect a decrease or increase in the speed of the propellers and the speed of the engines for rotating the same, at substantially the same engine throttle control settings. The pitch change mechanism for each of the propellers is preferably electrically controlled and includes a pitch increasing control circuit 8, a pitch decreasing control circuit 9, and a manual switch 10 for selectively closing one or the other of said circuits to energize the same by the battery 11 and effect a change in propeller pitch and change in prime mover speed. The electrical connectors for the pitch change circuits are suitably connected to a conventional pitch change mechanism preferably in the propeller hub, through slip rings contained in the collars 12, the individual slip rings not being shown in detail.

Electrical relays 13 and 14 are provided for selectively closing the pitch decreasing and increasing circuits 8 and 9, these pitch increasing and pitch decreasing relays being connected respectively by the electrical conductors or circuit connections 13a and 14a to my improved synchronizer control device indicated generally at 15. A source of electrical energy such as a battery is indicated at 16, having an electrical connection 17 extending into the casing of the synchronizer device intermediate the conductors 13a and 14a. A conductor 18b leads from a rotary single contact member later to be described and located within the synchronizer device, and is connected to an electrical energy storing and discharging device 18 such as an electrical condenser having a finite value.

As seen in Fig. 1, the common return conductor for the pitch increasing and decreasing circuits 8 and 9 is indicated at 8a and grounded at 19, the common return conductor for the pitch decreasing and pitch increasing relay circuits is indicated at 13b and grounded at 19', the battery 16 is grounded by the conductor 16a at 19a, and the condenser 18 is connected by the conductor 18a to ground at 19b, thereby establishing a single or common return or ground circuit, completing electrical circuit connection for these electrical elements 6, 13, 14, 16 and 18.

Referring more particularly to Figs. 2 to 5, my improved synchronizer device, as illustrated, includes a pair of independently rotatable contact members 19 and 20 disposed within a suitable casing 21. The contact member 19 of cylindrical form having an end contact face provided with one or more groups of three relatively insulated electrical contacts 22, 23, and 24. Slip rings 22a, 23a and 24a are provided around the periphery of the contact member 19, establishing separate electric connections to the respective contacts 22, 23 and 24. The rotary contact member 20 is provided with a single contact 20a, yieldably projecting into contacting relation with the end contact face of the contact member 19 so as to successively engage each of the contacts 22, 23, and 24 when the rotary contact members 19 and 20 are rotating at different relative speeds, a slip ring 20' is provided around the periphery of the contact member 20 and electrically connected to the single contact 20a.

Suitable contact brushes 20b, 22b, 23b and 24b are carried by the casing 21 in insulated relation to each other, and yieldably urged into contact respectively with the slip rings 20', 22a, 23a and 24a that are connected to the electrical contacts 22, 23, 24 and 20a on the two rotary contact elements 19 and 20. Referring to Fig. 3, the single rotary contact member 20 is suitably journalled in the casing 21 at 25 having a splined driving connection 26 adapted to be driven by the engine or prime mover to be synchronized. The plural rotary contact element 19 is preferably fixedly secured on a drive shaft 26a disposed in concentric relation to the rotary axis of the contact member 20, this shaft being driven by any suitable means, preferably from a prime mover or motor having a predetermined reference speed which is equal to the desired speed of rotation of the rotary single contact element 20 that is driven by the prime mover to be synchronized.

Referring to Figs. 1, 4 and 5, electrical conductor 17 from the battery 16 is connected to the brush contact 23b, establishing an electrical connection between the battery 16 and the intermediate contact 23 of the rotary contact member 19 between the other two contacts 22 and 24. The electrical conductors 13a and 14a respectively are connected to the brush contacts 22b and 24b, thus electrically connecting the pitch increasing and decreasing relays 13 and 14 to the end contacts 22 and 24 of each group or groups of the three contacts 22, 23 and 24 on the rotary contact member 19. The conductor 18 from the energy charging and storing condenser device is connected to the brush contact 20b, thus establishing an electrical connection between the condenser 18 and the single contact 20a on the rotary contact element 20. During relative rotation between the rotary contact elements 19 and 20, the single contact member 20a will be relatively moved into contact with the contact 23 at some time to establish an electric connection between the battery 16 and condenser 18 and the condenser will be charged by the battery 16. Continued rotative departure between the two rotary contact elements 19 and 20 relatively moves the single contact member 20a out of condenser charging contact with the battery 16, as the single contact 20a moves out of contact with the contact 23 and into discharging contact with one or the other of the pitch increasing or decreasing contacts 22 or 24 on the plural rotary contact element 19, depending upon the relative direction of departure between the two rotary contact elements 19 and 20, causing one or the other of the relays 13 or 14 to be energized, energizing the reversible servomotor device adjusting the pitch of the propeller controlled thereby to decrease or increase the speed of the prime mover to be synchronized.

The size or capacity of the condenser 18 with respect to the inductance and resistance of the relay coils and circuits must have a finite value such that the condenser cannot absorb a charge greater than will be discharged through one of the pitch increasing or decreasing relay circuits for any value of "out-of-synchronism," and the value of the resistance in the condenser relay elements should be great enough to prevent oscillation of the current in the circuits. Therefore, continued departure between the rotary contact elements 19 and 20, causing a contacting engagement of the single contact 20a with the succeeding relay circuit contact, will not effect a sufficient condenser discharge through this contact and its connected circuit to actuate the other relay without the single contact 20a first moving again into contacting engagement with the battery contact 23 of the rotary contact element 19. Referring again to Fig. 1, the rotary single contact element 20 is driven directly by the engine to be synchronized and the rotary plural contact element 19 is preferably driven by the three phase A. C. synchronous motor 32 from a three phase operating circuit 30 that is supplied by a three phase A. C. dynamo or generator 32a driven at any predetermined reference speed by a governor control motor 32b, the speed of which may be adjusted by the control knob 33. When the control knob 33 is set to determine the reference speed of the three phase dynamo or generator 12b, the synchronous motors 32 will rotate at the same reference speed, thereby driving the rotary plural contact disc members 19 located within the synchronizer units, at the same reference speed or a fixed reference speed ratio to the dynamo or generator 32a. Since the rotary plural contact elements 19 are driven in synchronized speed relation by or to the respective prime movers 1 and 2, any variation in the speeds of these prime movers with respect to the reference speed of the plural contact discs will cause the single contact on the disc 20 to progressively engage the battery contact 23 on the rotary plural contact member 19 and charge the condenser 18, further relative rotative movement causing the single contact to then interrupt the circuit connection between the battery 16 and the condenser 18 and connect the condenser to one or the other of the pitch change circuits. The charged condenser will then substantially completely discharge into the selected pitch change circuit, pulsing one of the relays 13 or 14 to momentarily energize the pitch change circuit and adjust the pitch of the propeller driven by the prime mover to regulate the speed of the engine and bring the engine speed back into synchronized relation with the speed of the single rotary contact member 19. The reference numerals 34 and 35 in Figs. 1 and 2 each indicate a conventional three phase tachometer circuit that is common to each of the aircraft engines 1 and 2. When it is desired to synchronize two engines with respect to each other, a synchronous motor such as indicated at 36 in Fig. 2 may be provided for driving the single contact rotary disc 20 and connected to the tachometer circuit from one of the engines such as the circuit 34 while the second synchronous motor such as the motor 32 may be provided and connected to the tachometer circuit 34 from the other engine. The servomotor speed regulating means 6 will then synchronize the speed of one of the engines, such as the engine 1 to the other engine which will be rotating at some desired reference speed.

Assuming that the engine which drives the synchronous motor 32 is the master or speed controlling engine, any increase or decrease in the speed of the other or slave engine will cause an increase or decrease in the speed of the rotary single contact disc 20 with respect to the rotary plural contact disc 19. If the two rotary contact discs or elements 19 and 20 are being rotated in the direction of the arrow 36a by the respective engines and the single contact disc 20 is caused to oscillate in the direction of the arrow 36b, the single contact member 20a will first be connected to the battery 16 through the contact 23 and charge the condenser 18. As the differential rotation between the discs 19 and 20 continues, the single contact member 20a will then engage the contact 22 on the rotary plural contact element in advance of the contact 24, operating the pitch change relay to increase the pitch of the slave engine propeller, causing the prime mover to be slowed down. The subsequent engagement of the single contact member 20a with the contact 24 on the plural rotary contact element 19, connected to the pitch decreasing relay will not cause the relay to be energized because the relative capacity of the condenser 18 and servomotor mechanism operating circuits is such that an insufficient electrical charge remains in the condenser to successively energize more than one of the relay circuits without the necessity of recharging the condenser again.

In the synchronizing apparatus disclosed in Fig. 3, the plural contact disc element 19 is connected directly to a motor device 32, adapted to have a predetermined reference speed and the rotay single contact disc element 20 is adapted to be connected to the prime mover, the speed of which is to be synchronized. While this invention has been described in connection with certain specific embodiments thereof, it is to be understood that the invention may be incorporated in many different embodiments, and changes made without departing from the spirit and concept of the invention as defined in the following claims.

I claim:

1. In a synchronizer for prime movers and the like, a reversible servomotor mechanism for controlling the speed of the prime mover, selective control means for said servomotor mechanism, a first element driven proportional to the speed of the prime mover, a second element driven proportional to a preselected desired prime mover speed, said elements being juxtaposed for relative rotation about a common axis, one of said elements having a group of three electrical contacts mounted thereon, one of said contacts being connected to a source of electrical current and the other two contacts being connected to said reversible servomotor mechanism control means to selectively actuate the same, a single contact on the other of said rotatable elements adapted to successively engage the contacts of said group upon a departure in the speed of the prime mover from the desired speed, the single contact being connected to an electrical storage means of finite storage capacity, said single contact when engaging the contact of said group connected to the power source, conducting current to said energy storing means, and further relative rotation between said elements due to a continued departure of the prime mover's speed from the desired speed, causing the electrical energy stored in said storage means to be selectively discharged through said servomotor mechanism control means to cause a corresponding correction in the speed of the prime mover.

2. In a synchronizer device, a par of independently rotatable contact members carried thereby, disposed in juxtaposed relation to rotate on a common axis, at least one group of three contacts disposed in spaced insulated relation to each other on one of said rotary contact members and in substantially equally spaced relation from said common axis, electrically conductive means extending from two of said contacts adapted to be connected to a reversible servomotor speed adjusting control mechanism, an electrically conductive means connected to the other of said three electrical contacts and adapted to be connected to a source of electrical energy, an electrical contact carried by the other of said rotary contact members disposed to successively contact with the aforesaid three electrical contacts when said rotary contact members are rotating at different speeds, an electrical energy storing condenser of finite value connected to said single contact to be electrically charged by said source of electrical energy when said single contact is disposed in contacting relation with the said other one of said three contacts and to be subsequently selectively electrically discharged through one or the other of the two remaining contacts upon contacting engagement by said single contact depending upon the direction of relative departure between the two rotary contact members to selectively momentarily energize the reversible servomotor speed control mechanism to increase or decrease the speed of a power driven member controlled thereby to be synchronized, means for driving one of said rotary contact members from said power driven member to be synchronized, said other rotary contact member having means for connecting the same to a power driven member driven at a predetermined reference speed.

3. In a speed synchronizing device for two prime movers comprising a pair of independently rotatable contact disc elements disposed in parallel concentric juxtaposed relation, means for rotating one of said disc elements from one of the prime movers having a predetermined reference speed, means for rotating the other disc element from the other prime mover, speed controlling means for the last-mentioned prime mover including a reversible electrically controlled servomotor speed controlling mechanism having a speed increasing circuit connection and a speed decreasing circuit connection, a source of electrical energy storing and discharging condenser device, a contact member carried by one of said rotary contact disc elements in contacting relation with the other rotary contact disc element and electrically connected to said electrical energy storing and discharging condenser device, spaced relatively insulated electrical contacts carried by said other rotary contact disc element, each of said spaced contacts being connected to one of said speed decreasing and increasing circuit connections for said reversible servomotor mechanism and disposed for successive contacting engagement with said single contact member when said contact disc elements are rotated at different speeds, to synchronize the speed of the servomotor speed controlled prime mover to the speed of the other prime mover when the energizing circuit connection is energized, a relatively insulated electrical contact being disposed intermediate said spaced electrical contacts to be contacted by said single contact during relative rotation between the disc elements and electrically connected to said source of electrical energy whereby said electrical energy storing and discharging condenser device is electrically charged when said single contact is in contact with said intermediate electrical contact, and whereby said electrical energy storing and discharge condenser device is selectively electrically discharged through one or the other of said speed increasing or speed decreasing circuit connections, to increase or decrease the speed of the prime mover to be synchronized through said servomotor speed controlling means when said last-mentioned prime mover is moved relatively faster or slower than the other prime mover, to bring the movement of the two prime movers into synchronized speed relation.

4. Apparatus as claimed in claim 3 in which the rotary disc element having the three contacts thereon is driven at a relative reference speed, by the prime mover having a reference speed and the disc element having the single contact is driven by the servomotor speed controlled prime mover, and the speed decreasing circuit contact is disposed in advance of the intermediate contact, relative to the direction of rotation of the two rotary contact discs, and the speed increasing contact is disposed behind the intermediate contact whereby the single contact, when its carrying disc element is rotating faster than the plural contact disc, will engage the intermediate contact to charge the condenser device and then engage the speed decreasing contact to electrically discharge the condenser device therethrough to energize said speed decreasing servomotor control circuit connection, said condenser device and each of said speed decreasing and increasing circuit connections having a capacity such that the condenser device cannot successively energize more than one of said speed decreasing and increasing circuits without again being charged by contact with the intermediate contact that is connected to the source of electrical energy.

5. In a synchronizer for prime movers and the like, a reversible servomotor mechanism controlling the speed of the prime mover to be synchronized having speed decreasing and speed increasing contact circuit connections, a first rotary single contact element driven proportional to the speed of the prime mover to be synchronized, a second rotary plural contact element driven proportional to the desired speed of the prime mover, said first and second contact elements being in juxtaposed relation for independent rotation about a common axis, said second, plural contact element, having one group of three relatively insulated electrical contacts thereon disposed in equally spaced relation to each other and from said common axes, the end contacts of said group of three contacts being connected to said reversible servomotor mechanism for reverse rotation of said servomotor mechanism when one or the other of said contacts are connected to a source of electrical energy, a source of electrical energy connected to the intermediate contact in the said group of three contacts, an electrical energy storing and discharging condenser device connected to the single contact for said rotary single contact element having a capacitance with respect to the inductance and resistance of the reversible servomotor mechanism such that the condenser device will be charged when the first rotary single contact element engages the intermediate contact of said second rotary plural contact element and will be substantially discharged to momentarily actuate the reversible servomotor mechanism during the time that the first rotary member single contact engages the face of one or the other of the end contacts of the group of three contacts on the second contact plural element, the positions of the end contacts of the plural rotary contact member being such that, with relation to the rotation of the first and second rotary contact elements, the end contact that is connected to the servomotor mechanism speed decreasing control circuit connection is located in advance of the intermediate contact and the end contact that is connected to the servomotor mechanism speed increasing control circuit connection is located in rear of the intermediate contact.

6. Apparatus as claimed in claim 5, in which the reversible servomotor mechanism speed decreasing and speed increasing control circuit connections each include a relay device for selectively energizing and controlling the direction of rotation of the servomotor to respectively increase and decrease the speed of the prime mover to be synchronized.

7. A synchronizing apparatus for engines comprising a reference speed shaft, a second shaft driven at a speed related to the speed of an engine whose speed is to be controlled, means for adjusting the speed of the engine to match the speed shaft, of the second shaft with the reference speed means responsive to over-speed of the second shaft relative to the first shaft for causing the speed adjusting means to reduce the speed of the engine, means responsive to underspeed of the second shaft relative to the first shaft for causing the speed adjusting means to increase the speed of the engine, and off-speed detecting means responding to the speeds of both shafts for sensing the amount and character of off speed and for applying a correcting force to the speed adjusting means, said detecting means including a single movable contact member, and a relatively movable group of three contacts progressively engageable by the single contact, a condenser of finite value connected with said single contact, one of said group of three contacts adapted to charge the condenser upon engagement with the single contact, and each of the other two contacts of the group when engaged by the single contact adapted to completely discharge the condenser.

8. A synchronizing apparatus for engines comprising a reference speed shaft, a second shaft driven at a speed related to the speed of an engine whose speed is to be controlled, means for adjusting the speed of the engine to match the speed of the second shaft with the reference speed and including a reversible electric servomotor, means responsive to over-speed of the second shaft relative to the first shaft for causing the servomotor to operate in a direction to reduce the speed of the engine, and means responsive to under-speed of the second shaft relative to the first shaft for causing the servomotor to operate in a direction to increase the speed of the engine, and sensing means for detecting any off-speed of the said shafts and for energizing the speed adjusting means to apply a corresponding correction, said sensing means including a brush and condenser of finite value in series, a commutator having bars engageable by the brush and including as a group a battery contact disposed between a pitch-increasing bar and a pitch-decreasing bar all progressively contactable with said brush for first charging the condenser to capacity then completely discharging the condenser through the respective servomotor before the condenser is again charged.

9. A synchronizing apparatus for engines comprising a reference speed shaft, a second shaft driven at a speed related to the speed of an engine whose speed is to be controlled, means for adjusting the speed of the engine to match the speed of the second shaft with the reference speed and including a reversible electric servomotor, a current source, an electric condenser, and two devices each responsive to condenser discharge and operable, respectively, for connecting the servomotor with the current source for operation of the motor in opposite directions, and means including elements operated respectively by said shafts and operable when the shaft speeds are unequal for effecting in recurrent sequence the charging of the condenser by the current source and the discharging of the condenser into one of the two devices depending whether the speed of the second shaft is greater or less than the speed of the first shaft said shaft operated elements including a brush in series with said condenser, a commutator having a series of bars one of which has circuit connections with said current source, a pair of bars spaced therefrom one on each side of said first mentioned bar and each spaced bar being in circuit relation with one of said two devices, whereby relative rotation between the said shafts effects sequential energization of the condenser and discharge of the condenser into either of the two said devices.

ROBERT C. TRESEDER.

REFERENCES CITED

The following references are of record in the file of this patent:

UNITED STATES PATENTS

| Number | Name | Date |
|---|---|---|
| 1,665,857 | Neldham | Apr. 10, 1928 |
| 2,232,751 | Wilson | Feb. 25, 1941 |
| 2,271,629 | Couch | Feb. 3, 1942 |
| 2,381,250 | Baumann | Aug. 7, 1945 |
| 2,399,772 | Wahlberg | May 7, 1946 |